(12) United States Patent
Rochelle

(10) Patent No.: US 7,316,423 B2
(45) Date of Patent: Jan. 8, 2008

(54) FITTING AND PIPE SECTION FOR JETTED BATH HEATERS

(75) Inventor: Gary P. Rochelle, Marina Del Rey, CA (US)

(73) Assignee: Global Heating Solutions, Inc., Allegan, MI (US)

( * ) Notice: Subject to any disclaimer, the term of this patent is extended or adjusted under 35 U.S.C. 154(b) by 0 days.

(21) Appl. No.: 11/205,281

(22) Filed: Aug. 15, 2005

(65) Prior Publication Data

US 2006/0131871 A1 Jun. 22, 2006

Related U.S. Application Data

(63) Continuation of application No. 09/805,673, filed on Mar. 12, 2001, now abandoned.

(51) Int. Cl.
*F16L 35/00* (2006.01)
(52) U.S. Cl. ............... 285/4; 285/15; 285/354; 392/501; 4/541.1
(58) Field of Classification Search ........... 285/133.21, 285/133.4, 133.11, 387, 388, 386, 415, 354, 285/31, 32, 4, 15, 93; 4/541.6, 545, 541.1; 392/501
See application file for complete search history.

(56) References Cited

U.S. PATENT DOCUMENTS

| | | |
|---|---|---|
| 932,805 A | 8/1909 | McLaughlin |
| 944,877 A | 12/1909 | Koschinski |
| 1,078,552 A | 11/1913 | Patterson |
| 2,297,966 A | 10/1942 | Luff |
| 2,595,705 A | 5/1952 | Rosecrans, Sr. |
| 2,871,032 A | 1/1959 | Woodling |
| 3,288,494 A | 11/1966 | Callahan, Jr. et al. |
| 3,332,709 A | 7/1967 | Kowalski |
| 3,480,299 A | 11/1969 | Henderson |

(Continued)

*Primary Examiner*—David Bochna
(74) *Attorney, Agent, or Firm*—Price, Heneveld, Cooper, DeWitt & Litton, LLP

(57) ABSTRACT

A fitting and pipe section assembly 10 that is capable of being installed in tubing 20A and 20B of a jetted bath to render the tubing 20A and 20B adaptable to accept a close fit fluid flow device 30. The fitting and pipe section assembly 10 includes a pipe section 12, first and second fittings 18A and 18B, and first and second indicia 17A and 17B. The pipe section 12 has a center segment 16 between inlet and outlet end portions 14A and 14B. The inlet and outlet portions 14A and 14B may be placed in fluid flow communication with an inlet and an outlet of the tubing 20A and 20B. The first and second fittings 18A and 18B are disposed on the inlet and outlet portions of the pipe section 14A and 14B. The first and second indicia 17A and 17B on the pipe section 12 define the center segment 16 of the pipe section 12 and guide post-installation cutting of the pipe section 12 at predetermined points. The center segment 16 of the pipe section 12 may be selectively removed leaving the inlet and outlet portions 14A and 14B including the first and second fittings 18A and 18B. The fitting and pipe section assembly 10 may accept the close fit device 30 between the inlet and outlet portions 14A and 14B of the fitting and pipe section assembly 10.

22 Claims, 13 Drawing Sheets

U.S. PATENT DOCUMENTS

| | | |
|---|---|---|
| 3,781,925 A | 1/1974 | Curtis et al. |
| 3,908,208 A | 9/1975 | McIlroy |
| 4,453,749 A | 6/1984 | McKinnon |
| 4,594,500 A | 6/1986 | Wright |
| 4,747,212 A | 5/1988 | Cavdek |
| 4,810,008 A | 3/1989 | Brodie |
| 5,033,775 A | 7/1991 | Matte et al. |
| 5,393,103 A | 2/1995 | Cretzler |
| 5,724,478 A | 3/1998 | Thweatt |
| 5,872,890 A | 2/1999 | LaCombe |
| 6,000,073 A | 12/1999 | Eddington |
| 6,092,246 A | 7/2000 | Ludlow |
| 6,154,608 A | 11/2000 | Rochelle |
| 6,318,761 B1 | 11/2001 | Robertson |

FITTING AND PIPE SECTION FOR JETTED BATH HEATERS

CROSS-REFERENCE TO RELATED APPLICATION

This application is a continuation of U.S. patent application Ser. No. 09/805,673, filed Mar. 12, 2001, now abandoned which is incorporated herein by reference in its entirety.

FIELD OF THE INVENTION

The present invention relates to heaters for jetted baths, spas above ground pools and the like, and particularly to fitting and pipe sections that may be pre-installed to assist in subsequent modification of the jetted bath.

BACKGROUND OF THE INVENTION

Jetted baths includes tubing that circulates water from the bath, through a pump, and back into the bath through jets. Jetted baths may be provided with a heater in the tubing circuit, that acts to maintain bath-water temperature after filling. Often it is advantageous or necessary to install these devices after the initial construction of the jetted bath (or other personal soaking reservoir), or after home installation of the jetted bath. Post-construction installation of these devices enables a limited number of product variations to be produced by a manufacturer, which can be modified later to meet the particular needs of an end user. This has the advantage of limiting manufacturing and purchase cost.

However, at present post-construction installation typically will depend on a skilled plumber to cut or open the tubing of a jetted bath and affix a device in fluid flow communication with the jetted bath. This is often expensive and inconvenient for the end user.

SUMMARY OF THE INVENTION

The present invention provides a fitting and pipe section assembly that is capable of being installed in tubing of a jetted bath to render the tubing adaptable to accept a close fit fluid flow device, such as a heater. The fitting and pipe section assembly includes a pipe section, first and second fittings, and, first and second indicia. The pipe section has a center segment between inlet and outlet end portions. The inlet and outlet portions may be placed in fluid flow communication with an inlet and an outlet of the tubing. The first and second fittings are disposed on the inlet and outlet portions of the pipe section. The first and second indicia on the pipe section define the center segment of the pipe section and guide post-installation cutting of the pipe section at predetermined points. The center segment of the pipe section may be selectively removed leaving the inlet and outlet portions including the first and second fittings. The fitting and pipe section assembly may accept the close fit device between the inlet and outlet portions of the fitting and pipe section assembly.

In the first embodiment, the pipe section has grooves provided at predetermined points for cutting, and has means for attaching to the close fit device insert once the cut center pipe segment is removed.

In a further aspect of the present invention, a method of modifying an installed jetted bath to accept a close fit device using a fitting and pipe section assembly that is installed in a segment of tubing of a jetted bath is provided. The method includes cutting the assembly along first and second indicia defined at first and second ends of a pipe section of the fitting and pipe section assembly. The cut pipe section is then removed from the fitting and pipe section assembly creating a gap between the first and second end portions of the fitting and pipe section assembly. A close fit device is then inserted in the fitting and pipe section assembly gap without either longitudinal or lateral displacement of the first and second end portions of the fitting and pipe section assembly. The close fit device is then secured in fluid flow communication with the first and second end portions of the fitting and pipe section assembly.

In the second embodiment of the invention, the pipe section has an additional T connection extending ninety degrees from the pipe tubing. The extra connection is not cut when removed, but rather unscrewed from the bath tubing, and the close fit device will have a corresponding extra connection for attaching to the bath tubing.

The present invention thus provides a fitting and pipe section assembly that can be pre-installed in a jetted bath or other personal soaking reservoir, which facilitates post-production or post-installation modification of the jetted bath. The present invention provides indicia which indicate where the pipe section should be cut so that a pre-sized close fit device can be inserted with a minimum gap of space between the remaining pipe section and the close fit device. These indicia eliminate any need to measure and mark the pipe section for cutting out a segment for insertion of a device. Further, where the indicia are physical groves, the indicia ensure exact cuts by guiding the cutting device.

The present invention further provides fittings at either end of the assembly. These fittings eliminate the need to modify the tubing of the jetted bath to secure a device in fluid flow communication with the tubing of the jetted bath. These fittings also eliminate any need for the close fit device to be provided with means for fastening to the smooth surface of the tubing of the jetted bath. Thus, the fittings eliminate the need to use an adhesive to secure a post-production device in the tubing of the product, thereby increasing the ease of product alteration and the integrity of the altered product. All these features increase the ease in which an end user of a jetted bath may modify the jetted bath.

Additionally, the present invention provides the ability for a manufacturer to designate the locations where post-production devices may be inserted into fluid flow communication with the tubing. This allows the manufacturer to ensure that later inserted devices will not have an adverse effect on the fluid flow characteristics in the tubing and will not unduly restrict any pumping device. The ability of manufacturer's to designate the location of later added devices and thus ensuring the fluid flow characteristics also assists in the manufacturer's ability receive certification from regulatory agencies for products that are intended to be modified after initial production.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
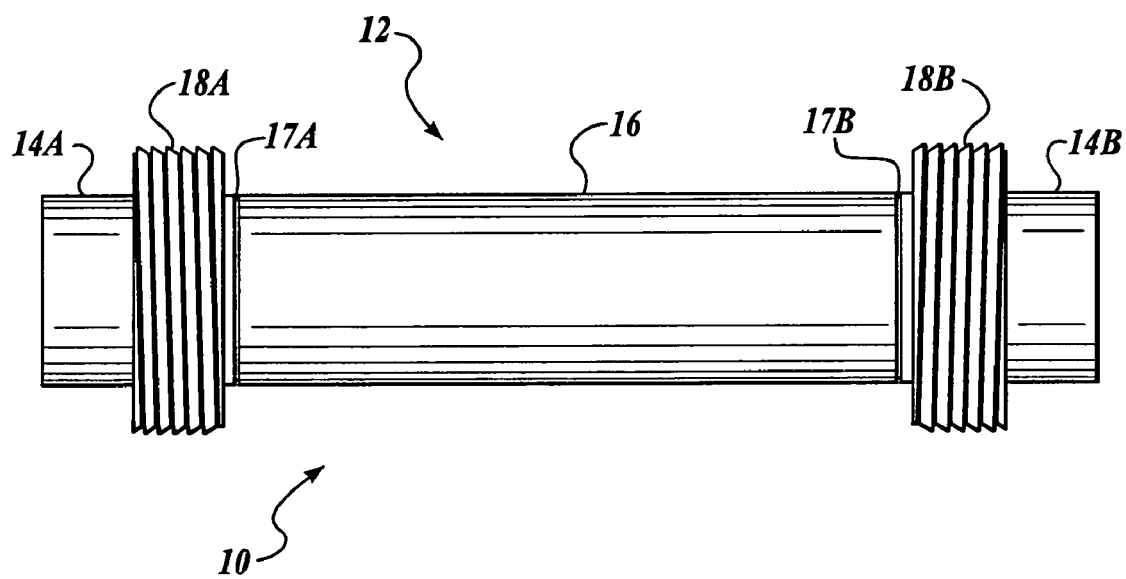
FIG. 1 is a side view of a fitting and pipe section according to the present invention.

A first embodiment of a fitting and pipe section assembly 10 constructed in accordance with the present invention is shown in FIG. 1. The fitting and pipe section assembly 10 is suitable for installation in an existing tubing network into which water is drawn, treated, and then reintroduced into a jetted bath. The fitting and pipe assembly 10 makes it possible to modify previously constructed and/or installed jetted baths to accept a "water treatment device," which is intended herein to mean a heater for raising or maintaining bath-water temperature.

The fitting and pipe section assembly 10 includes a pipe section 12 and first and second fittings 18A and 18B, and is marked with first and second indicia 17A and 17B. The pipe section 12 has a center segment 16 between inlet and outlet end portions 14A and 14B respectively. The first and second fittings 18A and 18B are disposed on the inlet and outlet portions 14A and 14B of the pipe section 12 respectively. The first and second indicia 17A and 17B on the pipe section 12 define the center segment 16 of the pipe section 12, and guide post-installation cutting of the pipe section 12 at predetermined points. In one embodiment, the fitting and pipe section 10 is a unitary body.

Figure 2:
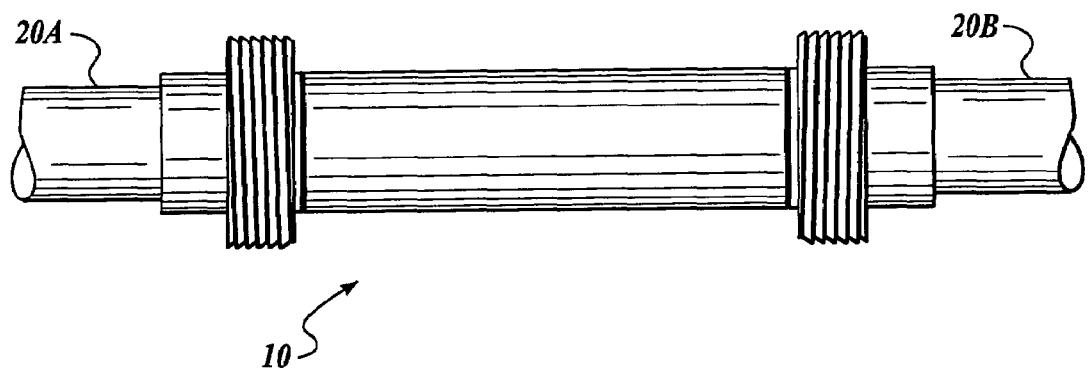
FIG. 2 is a side view of a fitting and pipe section connected to a tubing segment.

Referring to FIG. 2, the fitting and pipe section assembly 10 is capable of being installed in tubing 20A and 20B of a jetted bath. The inlet and outlet end portions 14A and 14B may be coupled in fluid flow communication to an inlet and an outlet of the tubing 20A and 20B respectively. The fitting and pipe section assembly 10 may be coupled to the tubing 20A and 20B by adhesive, corresponding grooves and threads, or other known methods. Although FIG. 2 shows tubing 20 secured inside of the fitting and pipe section assembly 10, it will be understood that the fitting and pipe section assembly 10 could also be sized so that tubing 20 could be secured on the outer surface of the fitting and pipe section assembly 10.

Figure 3:
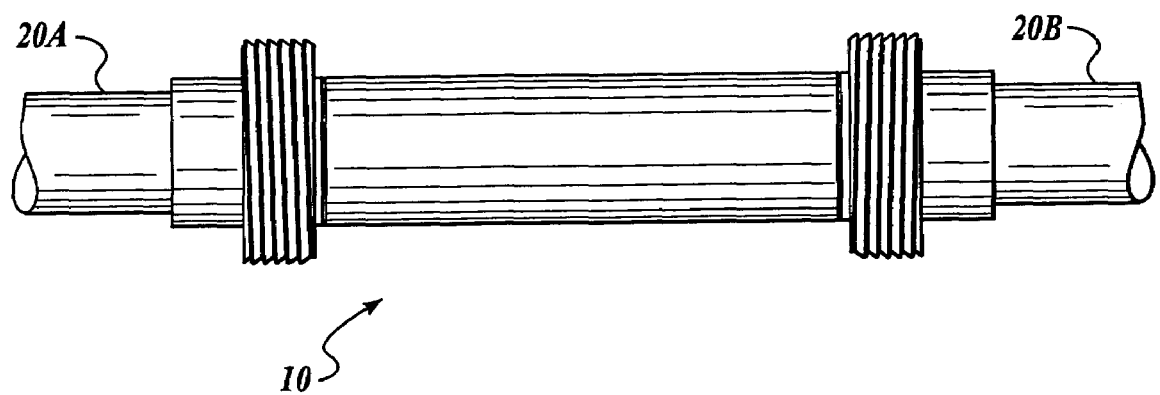
FIG. 3 is a side view of a fitting and pipe section where the center segment has been removed.

Referring to FIG. 3, the pipe section 12 may be cut along the first and second indicia 17A and 17B. As shown in FIG. 3, the indicia 17A and 17B may be annular grooves in pipe section 12. These annular grooves act as both visual guide for where to cut the pipe section 12, but also act to physically guide and center a cutting device. The cutting device may be a blade, cable saw, or any similar device. In a preferred embodiment, the cutting device is a cable saw, which is automatically centered within the groove during cutting. Further, the fitting and pipe section assembly 10 may include the cutting device assembled therewith, such as a cable saw threaded through a polymeric tubing with its ends connected by swaging, wire, or polymeric tie. Once the cutting device has fully cut pipe section 12 along both the first and second indicia 17A and 17B, the center segment 16 may be removed laterally from the pipe section 12, without any longitudinal or lateral displacement of the remaining inlet and outlet portions 14A and 14B. Thus the annular grooves ensure that there is proper spacing for inserting the close fit device 30, and that the inlet and outlet portions 14A and 14B have been cut straight and plumb. The removal of center segment 16 leaves the inlet and outlet portions 14A and 14B, including the first and second fittings 18A and 18B, connected to tubing 20A and 20B.

Figure 4:
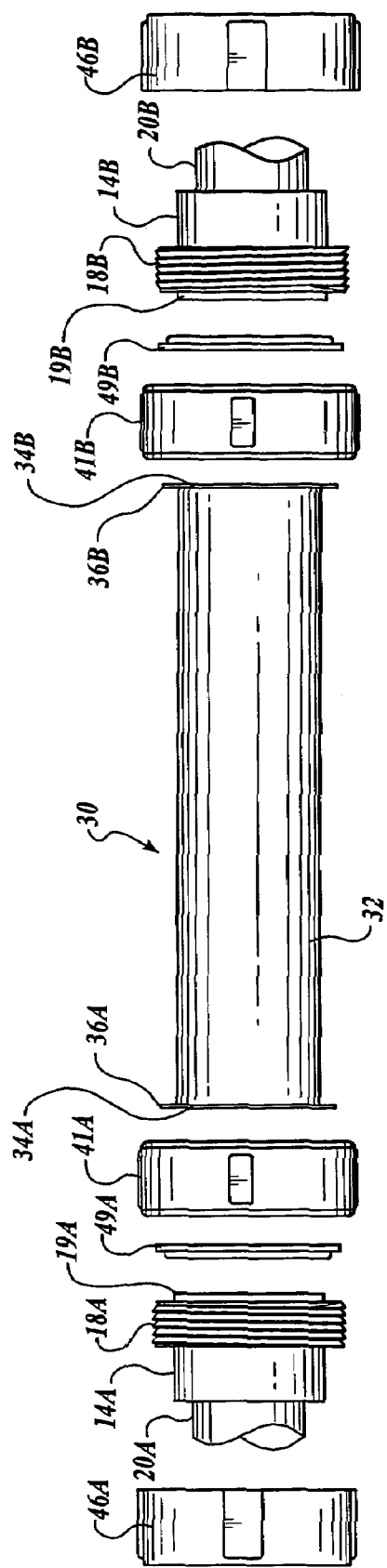
FIG. 4 is an exploded view of a fitting and pipe section where the center segment has been removed and replaced with a close fit device and a split nut fastening assembly.
Figure 5:
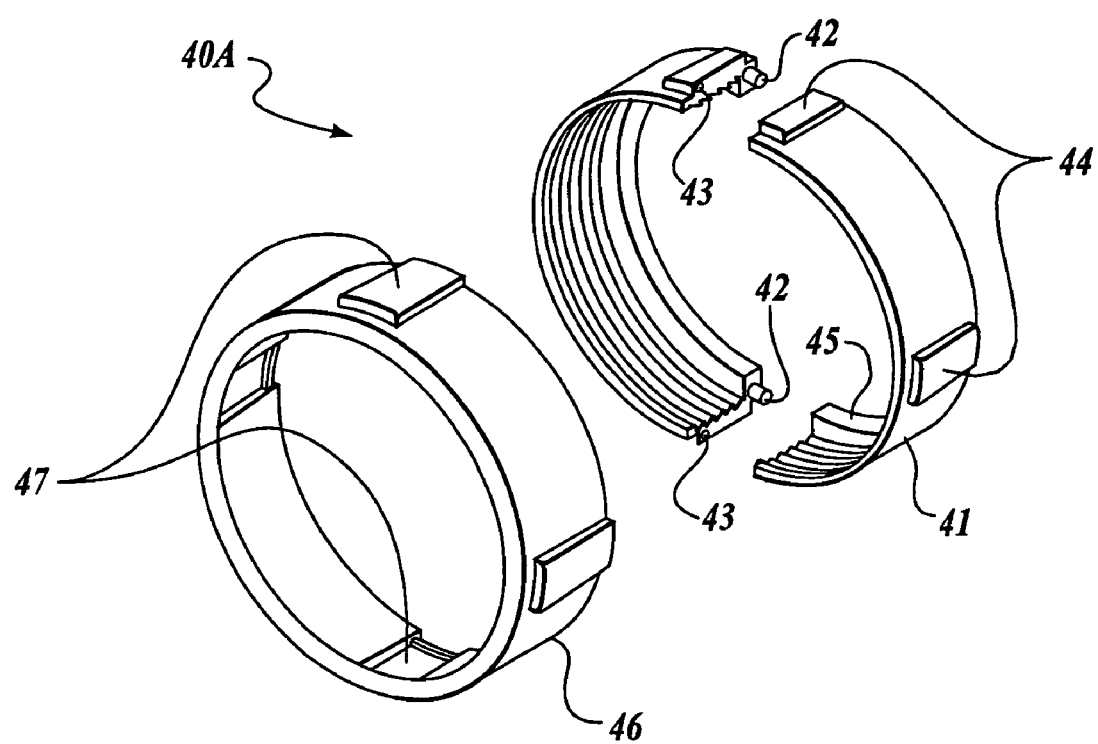
FIG. 5 is a perspective view of a split nut fastening assembly.
Figure 6:
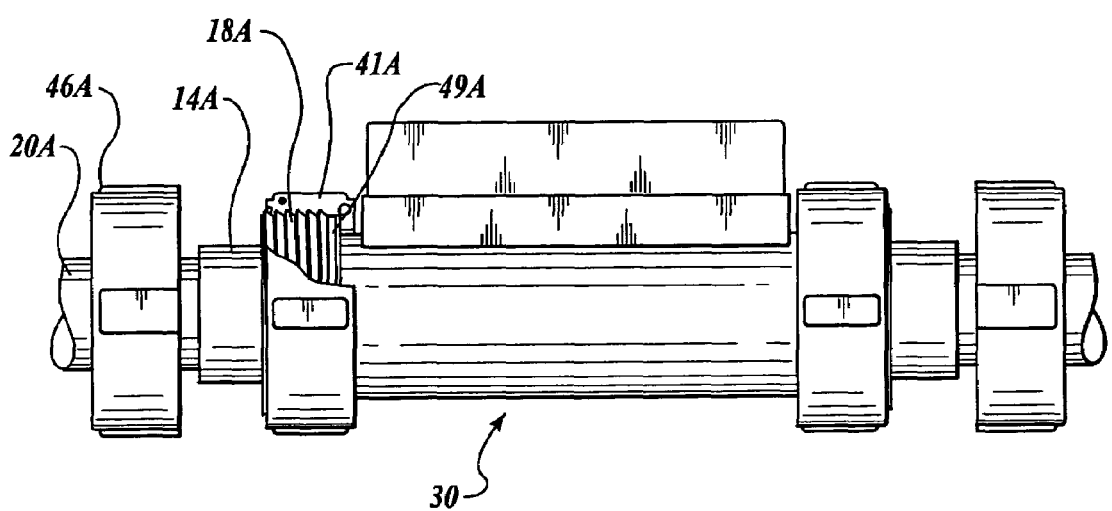
FIG. 6 is a cut away view of a fitting and pipe section where the pipe section has been removed and replaced with a close fit device and a split nut fastening assembly.

Referring to FIG. 4-6, once the center segment 16 is removed, the resulting gap has an exact longitudinal dimension to accept a close fit device 30, and outer seals 49A and 49B if necessary, between the inlet and outlet portions 14A and 14B of the fitting and pipe section assembly 10. In one embodiment, the indicia 17A and 17B are not placed flush with the fittings 18A and 18B, and are instead positioned a select distance along pipe section 12 away from the fittings 18A and 18B. This results in fitting lips 19A and 19B being formed when the center segment 16 is removed. The fitting lips are preferably the same width as the outer seals 49A and 49B, and assist in retaining the outer seals 49A and 49B in place against the fittings 18A and 18B. Alternatively outer seals 49A and 49B may include raised portions which can be inserted into corresponding recesses in the vertical faces of fittings 18A and 18B to hold outer seals 49A and 49B in place.

It will be understood that the term "close fit device" 30 as used herein includes a heater device for use in fluid flow communication with a jetted bath, that has a predetermined length which is received between stationary inlets and outlets separated by substantially the same predetermined distance as the length of the device, including outer seals 49A and 49B if necessary, such that it may be installed and/or removed without displacement of the inlet and outlet. Thus a close fit device 30 may include but is not limited to a heater that includes split nuts as in the embodiment described herein or that alternately includes a differing fastening assembly construction that allows close fit installation, such as a heater housing two piece split and screwed nuts that may be slid back sufficiently on the heater body for installation and removal, or a two piece nut and split retaining ring assembly such as is disclosed in U.S. Pat. No. 5,775,743 to Rochelle, or other constructions. The close fit device 30 for use with the present invention includes a main body 32, and inlet and outlet 34A and 34B for fluid flow communication with the jetted bath tubing 20A and 20B located at either ends of main body 32. The close fit device 30 also includes flanges 36A and 36B located respectively at the inlet and outlet ends 34A and 34B of close fit device 30.

Referring to FIG. 5, the close fit device 30 may be removably secured to the fitting and pipe section 10 by a first and second fastening assembly 40A and 40B. In one embodiment shown in FIGS. 4-6, fastening assembly 40A includes a two piece split nut 41A and a nut cover 46A. The fastening assembly 40A preferably also includes an outer seal 49A. The split nut 41A includes locking pins 42A, locking apertures 43A, locking tabs 44A, and split nut lip 45A. The locking pins 42A and locking apertures 43A are located along the surfaces dividing the two pieces of split nut 41A. The two pieces of split nut 41A may be removably secured together by locking pins 42A engaging locking apertures 43A. The locking tabs 44A are raised projections located on the outer surface of split nut 44. The nut cover 46A includes locking tab channels 47A, that engage the corresponding locking tabs 44A of split nut 41A. Thus the locking tab channels 47A hold the split nut in place when the fastening assembly 40A is assembled. Fastening assembly 40B is a mirror image of fastening assembly 40A.

To removably seal the close fit device 30 in fluid flow communication with the tubing 20 of the jetted bath, the first and second nut covers 46A and 46B are slidably placed about tubing 20A and 20B respectively. The first and second outer seals 49A and 49B may be positioned between the fittings 18A and 18B respectively and close fit device 30. Once the close fit device 30 is placed between the pipe inlet and outlet ends 14A and 14B, the first and second split nuts 41A and 41B may be slidably secured about the close fit device 30 connecting the two pieces of the split nuts 41A and 41B by inserting locking pins 42A and 42B into and engaging locking apertures 43A and 43B respectively. Split nuts 41A and 41B rotatably engage the first and second fittings 18A and 18B respectively. The split nut lips 45A and 45B likewise engage the close fit flanges 36A and 26B respectively, thus securing the close fit device to the fitting and pipe section 10. The nut covers 46A and 46B may now be slid so that the locking tab channels 47A and 47B engage, the corresponding locking tabs 44A and 44B thus preventing the locking pins 42A and 42B from disengaging locking apertures 43A and 43B respectively. If the split nuts 41A and 41B are not tightly secured about fittings 18A and 18B, then the nut covers 46A and 46B and the split nuts 41A and 41B may be additionally rotated to tighten the connection between the fitting and pipe section 10 and the close fit device 30.

Figure 7:
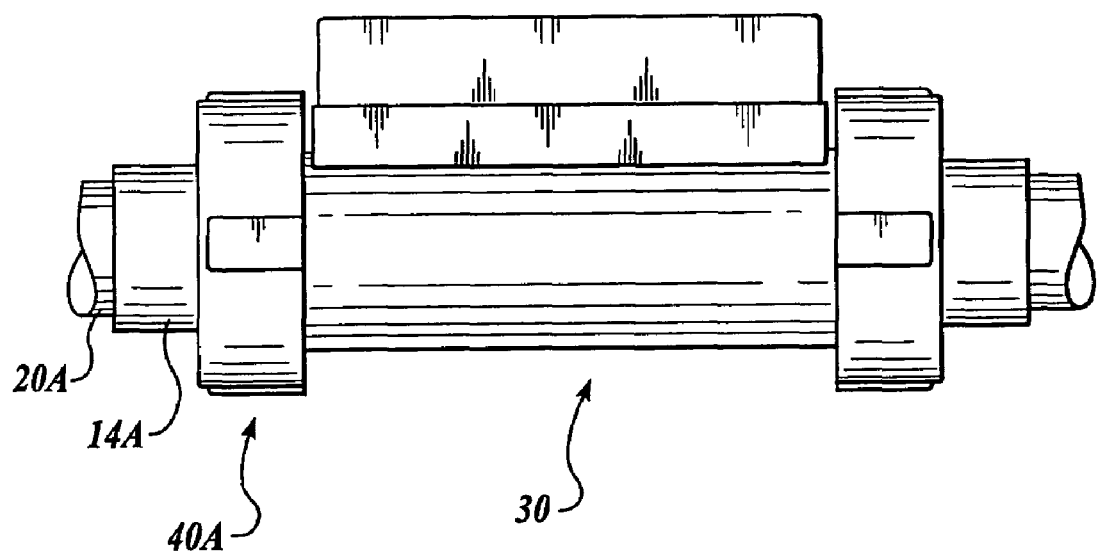
FIG. 7 is a perspective view of a fitting and pipe assembly where the pipe section has been removed and replaced with a close fit device and a split nut fastening assembly.

Referring to FIG. 7, the fitting and pipe section 10 is shown with a close fit device 30 fully installed and in fluid flow communication with the tubing 20 of a jetted bath.

Figure 8:
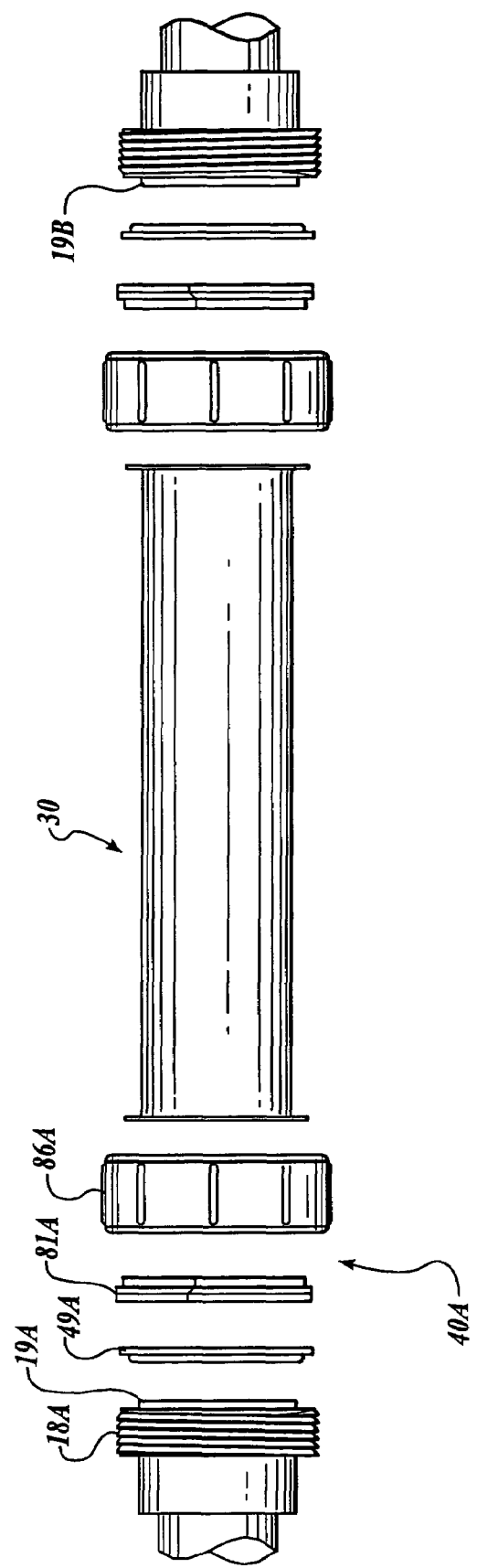
FIG. 8 is an exploded view of a fitting and pipe section where the pipe section has been removed and replaced with a close fit device and a union nut fastening assembly.

It will be understood that the fastening assembly 40 is not limited to those embodiments described herein, but also encompasses any fastener or fastener assembly capable of securing the close fit device to fittings 18A and 18B. Referring to FIG. 8, an alternative embodiment of the fastening assembly 40 is shown. The alternative fastening assembly 40 includes a split nut retainer 81A, union nut 86A and the outer seal 49A. When used to secure the close fit device 30 in fluid flow with the tubing 20 of the jetted bath, union nut 86A is slid about the close fit device before the close fit device is inserted between the ends of the fitting and pipe section 10. Next, the two pieces of split nut retainer 81A can be slidably and removably secured about close fit device 30 between the flange 36A and the union nut 86A. The union nut 86A rotatably engages the fitting 18A and the outer edge of the split nut retainer 81A. The inner edge of the split nut retainer also engages the close fit device flange 36A, allowing union nut 86A to secure the close fit device 30 to the fitting and pipe section 10. In another embodiment, a union nut could be slidably secured on the on the main body 32 of the close fit device 30 by placing the union nut about the main body 32 prior to formation of flanges 36A and 36B, and securing the union nut with the subsequent formation of flanges 36A and 36B. Alternatively, split nuts whose halves can be secured together, for example by nut and bolt pairs connecting the halves, could also be used as fastening assembly 40.

Figure 9:
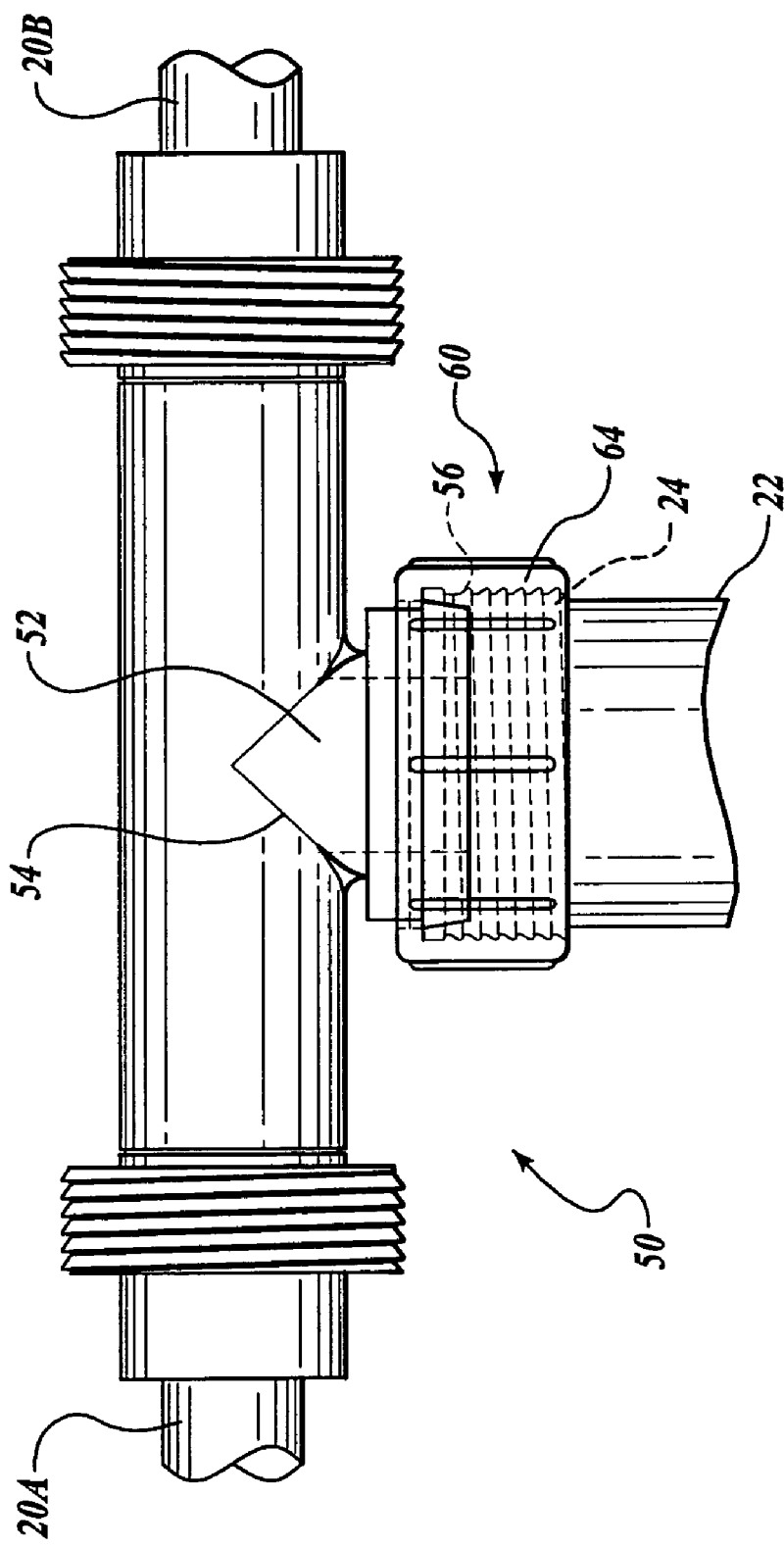
FIG. 9 is a side view of a T shaped fitting and pipe section according to the present invention.
Figure 10:
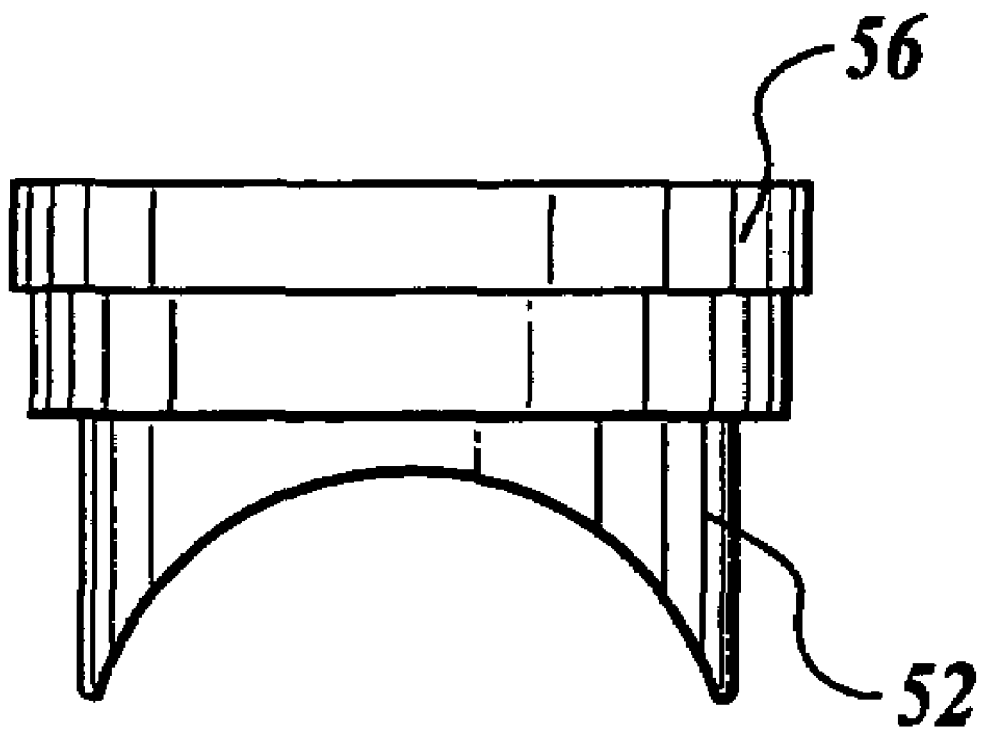
FIG. 10 is a side view of a transverse pipe branch of a T shaped fitting and pipe assembly.

In a second embodiment of the present invention a "T" shaped fitting and pipe section assembly 50 constructed in accordance with the present invention is shown in FIG. 9. The fitting and pipe section assembly 50 includes a "T" junction with a transverse aperture 54 in the pipe section 12 between the inlet and outlet 14A and 14B. A transverse pipe branch 52 defining a port extends perpendicular to the pipe section 12 and is connected in fluid flow communication with the transverse aperture 54. The transverse pipe branch 52 includes a transverse flange 56.

In the second embodiment the fitting and pipe section 50 is further capable of being installed with a transverse segment of tubing 22 of a jetted bath. The fitting and pipe section 50 may be removably secured to the transverse tubing segment 22 by transverse fastening assembly 60. In one embodiment shown in FIG. 9, fastening assembly 60 includes a union nut 64. The fastening assembly 60 preferably also includes an inner seal 62. The union nut 64 can be slidably retained about the transverse pipe branch 52 by the transverse flange 56. Tubing 22 includes a transverse fitting 24 located at the end of tubing 22. The union nut 64 may removably engage the fitting and pipe section 50 to the tubing 22 by rotatably sealing fitting 24 to the transverse pipe branch 52. Additionally an inner seal 62 may be provided that is captured between the fitting 24 and the transverse pipe branch 52.

It will be understood that alternative elements may be provided for removably engaging the pipe branch 52 to the tubing 22 without departing from the present invention. For example, in another embodiment, the transverse pipe branch 52 could be provided with a fitting and the transverse tubing segment 22 could be provided with a nut to removably engage the transverse pipe branch 52. Additionally, the union nut 64 could be replaced with a fastening assembly similar to those described above, including split nut 41 and nut cover 46 or a split nut retainer 81 and union nut 86.

The center segment 16 may be removed in a similar manner to that provided in the first embodiment. However, if the transverse pipe branch is connected to the center segment 16 of pipe section 12, then the nut 56 must be rotatably disengaged from transverse tube fitting 24 for complete removal of center segment 16.

Figure 11:
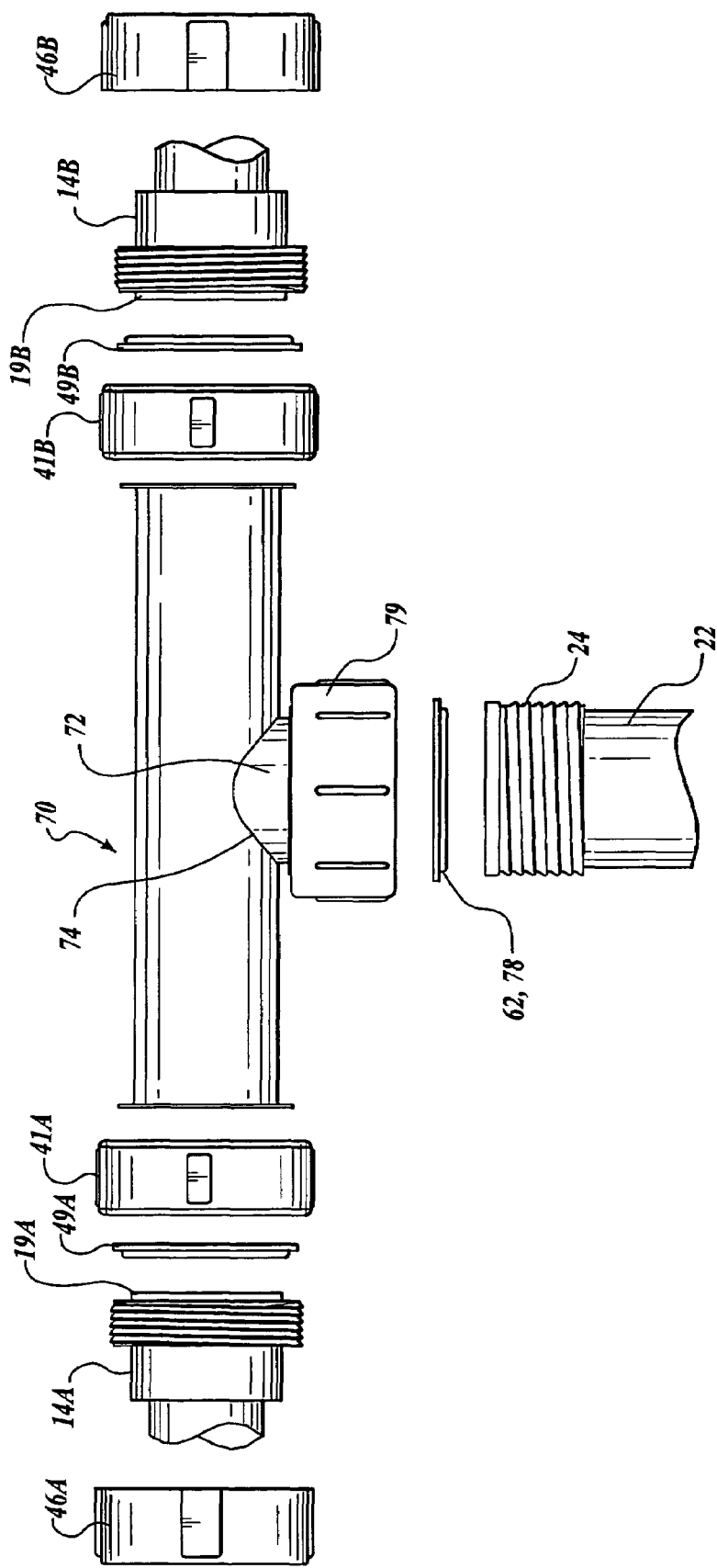
FIG. 11 is an exploded view of a T shaped fitting and pipe section where the pipe section has been removed and replaced with a T shaped close fit device and a split nut fastening assembly.
Figure 12:
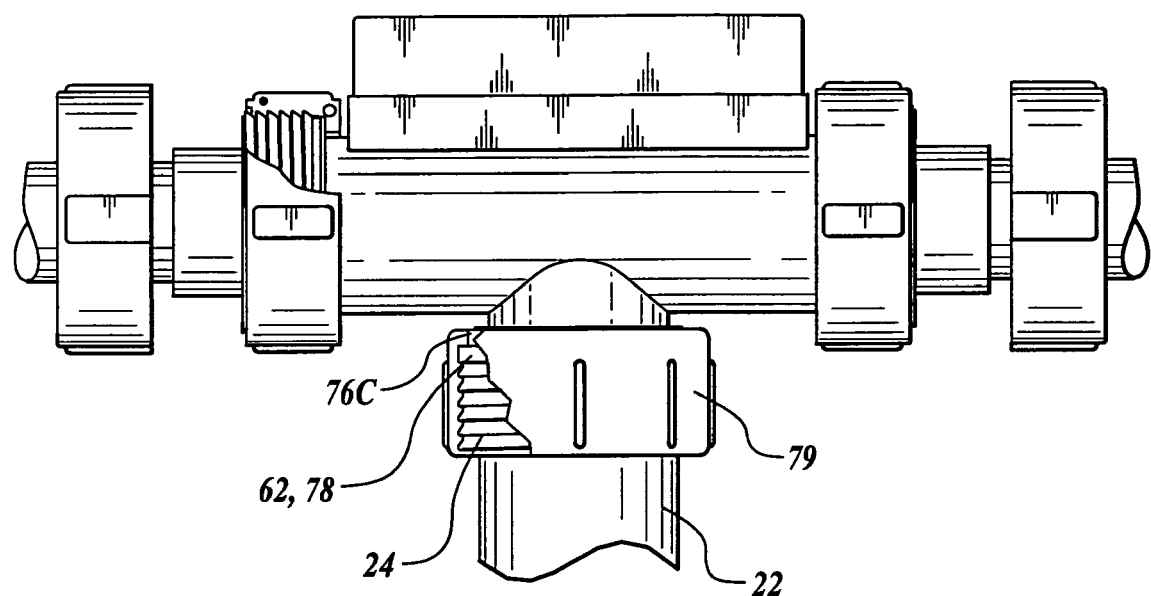
FIG. 12 is a cut away view of a T shaped fitting and pipe section where the pipe section has been removed and replaced with a T shaped close fit device and a split nut fastening assembly.

Referring to FIGS. 11-12, once the center segment 16 is removed, the T shaped fitting and pipe section assembly 50 may accept a T shaped close fit device 70 between the inlet and outlet portions 14A and 14B. The T shaped close fit device 70 for use with the present invention includes a transverse aperture 74 between the inlet and outlet 34A and 34B. A transverse pipe branch 72 defining a port extends perpendicular to the close fit device main body 32 and is connected in fluid flow communication with the transverse aperture 74. The transverse pipe branch 72 includes a transverse flange 76. The close fit device 70 may be removably secured to the transverse tubing segment 22 by close fit transverse fastening assembly 77. In one embodiment fastening assembly 77 includes a union nut 79. The fastening assembly 77 preferably also includes an inner seal 78. The union nut 79 can be slidably retained about the transverse pipe branch 72 by the transverse flange 76. The union nut 79 may removably engage the close fit device 70 to the tubing 22 by rotatably sealing fitting 24 to the transverse pipe branch 72. Additionally an inner seal 78 may be provided that is captured between the fitting 24 and the transverse pipe branch 72. Installation is completed with the fitting and pipe section 50 being secured to the close fit device 70 in the same manner as in the first embodiment.

Figure 13:
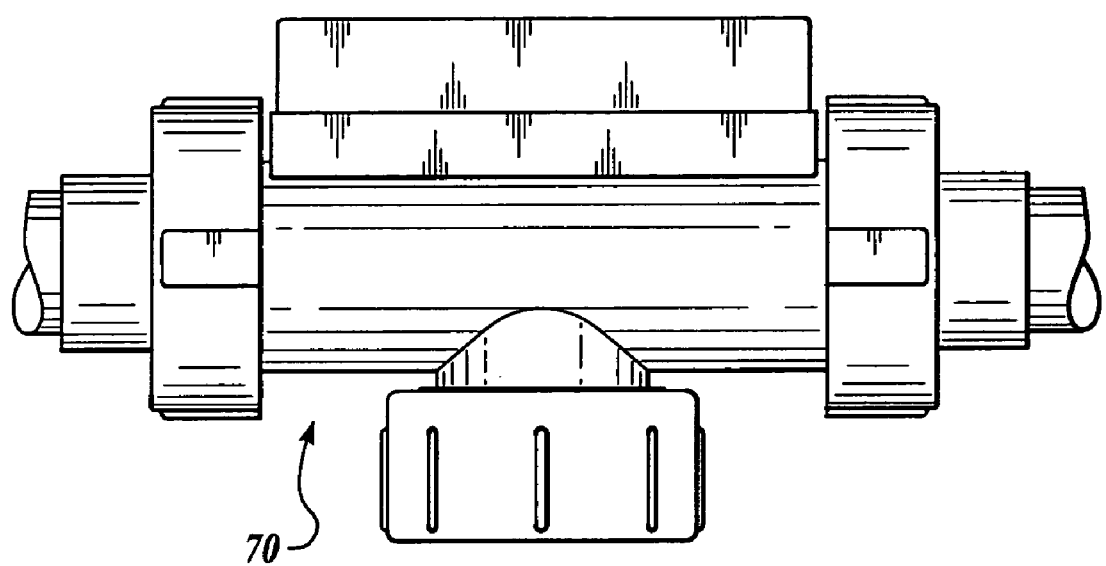
FIG. 13 is a perspective view of a T shaped fitting and pipe section where the pipe section has been removed and replaced with a T shaped close fit device and a split nut fastening assembly.

Referring to FIG. 13, the T shaped fitting and pipe section 50 is shown with a T shaped close fit device 70 fully installed and in fluid flow communication with the tubing 20A, 20B, and 22 of a jetted bath.

In the second embodiment described above, the transverse pipe branch 52 and close fit transverse pipe branch 72 are shown as being centered along the fitting and pipe assembly 50 and close fit device 70 respectively. In another embodiment, transverse pipe branch 52 and close fit transverse pipe branch 72 may be positioned off center.

In another embodiment, the center segment 16 may be removably attached to the inlet and outlet portions 14A and 14B of pipe section 12. In this alternative embodiment indicia 17A and 17B are not included, because cutting the fitting and pipe section 10 would be unnecessary. In this embodiment, the center segment could include flanges at its outlet and inlet ends, and could be removably attached to fittings 18A and 18B by fastening assembly 40A and 40B.

In an alternative embodiment, the indicia 17A and 17B may include visual guides, including but not limited to paint. This is not preferred, since it is advantageous to physically guide the cutting device to assist in ensuring an acceptable cut.

While the preferred embodiment of the invention has been illustrated and described, it will be appreciated that various changes can be made therein without departing from the spirit and scope of the invention.

The invention claimed is:

1. A fitting and pipe section assembly that is capable of being installed in tubing of a jetted bath to render the tubing adaptable to accept a close fit device, comprising:
    a pipe section having a center segment integrally formed with inlet and outlet end portions of the pipe section for fluid flow coupling to an inlet and an outlet of the tubing, wherein the pipe section includes indicia for guiding cutting of the pipe section at a predetermined location; and
    a first fitting coupled to the inlet portion and a second fitting coupled to the outlet portion of the pipe section, wherein each of the first and second fittings include external straight threads adapted to threadably engage a union nut and an annular engagement surface adapted to couple to a fitting of a close fit device, wherein the annular engagement surfaces face one another, and wherein when the center segment is coupled to the tubing, the engagement surfaces are disengaged from any fitting.

2. The fitting and pipe section assembly of claim 1, wherein the fitting and pipe section assembly is an integral body.

3. The fitting and pipe section assembly of claim 1, wherein the annular engagement surfaces are ring-shaped.

4. The fitting and pipe section assembly of claim 3, wherein the external threads of the first and second fittings each define an axis, and wherein the axes are aligned and the annular engagement surfaces extend perpendicular to the axes.

5. The fitting and pipe section assembly of claim 3, wherein the indicia comprise annular grooves, and the pipe section has generally cylindrical surfaces directly adjacent the groove on opposite sides thereof, and wherein the annular engagement surfaces extend from the cylindrical surfaces outwardly to the external threads.

6. The fitting and pipe section assembly of claim 1, wherein the close fit device is selected from the group consisting of a heater, ozone generator, chemical dispenser, fragrance dispenser, filter, pump, valve, flow meter, or water softener.

7. The fitting and pipe section assembly of claim 1, wherein the fitting and pipe section is further capable of being installed with a transverse tubing segment of a jetted bath, wherein the fitting and pipe section assembly further comprises a "T" junction; wherein the pipe section includes an inlet and outlet at the longitudinal ends of the pipe section and an aperture there between; and wherein a transverse pipe branch defining a port extends perpendicular to the pipe section from the aperture.

8. The fitting and pipe section assembly of claim 7, wherein the transverse pipe branch may be removably fastened to a transverse tubing segment of the jetted bath.

9. A jetted bath having tubing for fluid flow, comprising:
    a pipe section having center segment and inlet and outlet end portions coupled to the tubing;
    first and second fittings disposed on the inlet and outlet portions of the pipe section, the first and second fittings each including straight external threads and annular engagement surfaces, wherein the annular engagement surfaces of the second fittings face each other;
    wherein the pipe section includes first and second indicia on the pipe section that guide post-installation cutting of the pipe section at predetermined points;
    wherein the center segment of the pipe section may be selectively removed from the pipe section by cutting at the first and second indicia, leaving the inlet and outlet portions including the annular engagement surfaces and the external threads of the first and second fittings; and
    wherein the fitting and pipe section assembly may accept the close fit device between the inlet and outlet portions of the fitting and pipe section assembly.

10. The jetted bath of claim 9, wherein the close fit device may be secured to the fittings by a first and second fastening assembly.

11. The jetted bath of claim 10, wherein the close fit device may be removably secured to the first and second fittings by the first and second fastening assembly.

12. The jetted bath of claim 11, wherein the first fastening assembly comprises a union nut and a split nut retainer.

13. The jetted bath of claim 11, including tubular heater having outwardly-extending annular inlet and outlet flanges at opposite ends thereof, wherein the flanges define end surfaces, the tubular heater having a length defined by the end surfaces of the flanges that is about the same as a distance between the annular engagement surfaces of the first and second fittings.

14. The jetted bath of claim 9, wherein the fitting and pipe section assembly is a unitary body.

15. The jetted bath of claim 9, wherein the close fit device is selected from the group consisting of a heater, ozone generator, chemical dispenser, fragrance dispenser, filter, pump, valve, flow meter, or water softener.

16. The jetted bath of claim 9, wherein the fitting and pipe section is further capable of being installed with a transverse tubing segment of a jetted bath, wherein the fitting and pipe section assembly further comprises a "T" junction; wherein the pipe section includes an inlet and outlet at the longitudinal ends of the pipe section and an aperture there between; and wherein a transverse pipe branch defining a port extends perpendicular to the pipe section from the aperture.

17. The jetted bath of claim 16, wherein the transverse pipe branch may be removably fastened to the transverse tubing segment of the jetted bath.

18. The jetted bath of claim 9, wherein the first and second indicia comprise annular grooves.

19. A fitting and pipe section assembly and interchangeable heater device for mounting in fluid flow communication in tubing of a jetted bath, comprising:

a pipe section having a center segment integrally formed with inlet and outlet end portions of the pipe section, each of the end portions carrying a first close fit fitting having external straight threads integrally formed with the end portion, wherein the first close fit fittings include ring-shaped first annular engagement surfaces that are spaced apart a first dimension and face one another, the inlet and outlet end portions being adapted to be coupled in fluid flow communication to an inlet and outlet of the tubing to install the pipe section in the tubing; and a heater device having a tubular body defining an inlet end and an outlet end, each of the inlet and outlet ends carrying a second close fit fitting having second annular engagement surfaces that face outwardly away from the inlet and outlet ends and define a second dimension therebetween that is no greater than the first dimension, wherein the center segment can be selectively laterally removed from between the inlet and outlet end portions arid the heater device can then be laterally inserted in place of the center segment between the inlet and outlet end portions of the pipe section, wherein the second close fit fittings of the heater device engage the first close fit fittings of the pipe section without displacement of the installed inlet and outlet end portions of tubing.

20. A jetted bath including a fitting and pipe section assembly that is installed in tubing of the jetted bath to render the tubing adaptable to accept a close fit device, the fitting and pipe section assembly comprising:

(a) a pipe section having a center segment disposed between inlet and outlet end portions for fluid flow coupling to an inlet and an outlet of the tubing, wherein the pipe section includes first and second indicia on the pipe section that guide post-installation cutting of the pipe section at predetermined points and removal of the center segment; and (b) first and second fittings disposed on the inlet and outlet portions of the pipe section; wherein the center segment of the pipe section may be selectively removed by cutting the pipe section at the first and second indicia thereby leaving the inlet and outlet portions including the first and second fittings; and wherein the fitting and pipe section assembly may accept the close fit device between the inlet and outlet portions of the fitting and pipe section assembly.

21. The jetted bath of claim 20, wherein the first and second fittings each include a ring-shaped annular engagement surface adapted to couple to a fitting of the close fit device, wherein the ring-shaped annular engagement surfaces face one another.

22. A fitting and pipe section assembly that is capable of being installed in tubing of a jetted bath to render to tubing adaptable to accept a close fit device, comprising:

a pipe section having a center segment extending between inlet and outlet end sections for fluid flow coupling to an inlet and an outlet of the tubing, the inlet and outlet end sections each including straight external threads and a ring-shaped annular engagement surface adapted to couple to the close fit device, wherein when the center segment is coupled to the tubing, the engagement surfaces face one another;

wherein the center segment of the pipe section may be selectively removed from the pipe section leaving the inlet and outlet end sections; and wherein once the center segment is removed, the close fit device may be coupled to the engagement surfaces of the inlet and outlet end sections so as to be disposed between the inlet and outlet end sections of the pipe section.

* * * * *